UNITED STATES PATENT OFFICE 2,489,234

THIOPHANES AND METHOD FOR THEIR PRODUCTION

Moses Wolf Goldberg, Upper Montclair, and Leo H. Sternbach, Montclair, N. J., assignors to Hoffmann-La Roche Inc., Roche Park, Nutley, N. J., a corporation of New Jersey No Drawing. Application July 16, 1947, Serial No. 761,444

11 Claims. (Cl. 260—309)

Our invention relates to new compounds and more particularly to 3,4-(2'-keto-imidazolido)-thiophanes which are characterized by the following formula:

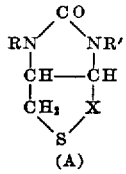

(A)

In the above formula X stands for C=O, $CH_2$ and CH(OH); R and R' stand for hydrogen, or a radical which can be replaced by hydrogen, at least one of R and R' being such a radical. Thus, either or both of the N atoms may carry such radicals. As examples of radicals replaceable by hydrogen, there are mentioned aralkyl radicals, for example, α-aralkyl radicals like benzyl and α- or ring-substituted benzyl, for instance α-methyl- and α-ethyl-benzyl, o-methyl-benzyl, p-ethyl-benzyl, p-methoxy-benzyl, p-ethoxy-benzyl; or acyl radicals, for example, lower acyl radicals, for instance, acetyl, propionyl, butyryl, and the like.

The new compounds are valuable intermediates for the synthesis of biotin, and an example of our new class of compounds has already been described for this purpose in our copending application Serial No. 673,642, filed May 31, 1946, of which the instant application is a continuation-in-part. Our parent application relates to the preparation of biotin, while the present application is more specifically concerned with 3,4-(2-keto-imidazolido)-thiophanes of the above-described generic formula, which are new compounds, and to methods for their production. The intermediates employed in the preparation of the new thiophanes are described in the above-mentioned application and also in our application Serial No. 744,152, filed April 26, 1947, of which the instant application is also a continuation-in-part.

As specific examples of compounds coming within the scope of our invention, the following may be mentioned:

1. The thiolactone of 1,3-dibenzyl-cis-4-carboxy-5-mercaptomethyl-imidazolidone-2 or 3,4-(1',3'-dibenzyl-2'-keto-imidazolido)-2-keto-thiophane,
2. 3,4-(1',3'-dibenzyl - 2' - keto - imidazolido)-thiophane,
3. 3,4-(1',3'-dibenzyl - 2' - keto - imidazolido)-2-hydroxy-thiophane,
4. 3,4-(N-monobenzyl - 2' - keto - imidazolido)-thiophane,
5. 3,4-(N-monobenzyl - 2' - keto - imidazolido)-2-hydroxy-thiophane,
6. 3,4-(N-monobenzyl - 2' - keto - imidazolido)-2-keto-thiopane,
7. 3,4-(1',3'-di-p-methoxybenzyl-2'-keto-imidazolido)-2-keto-thiophane,
8. 3,4-(1',3'-di-p-methoxybenzyl-2'-keto-imidazolido)-thiophane.
9. 3,4-(1',3'-di-p-methoxybenzyl-2'-keto-imidazolido)-2-hydroxy-thiophane,
10. 3,4-(N-p-methoxybenzyl-2'-keto - imidazolido)-thiophane,
11. 3,4-(N-p-methoxybenzyl-2'-keto - imidazolido)-2-keto-thiophane,
12. 3,4-(N-p-methoxybenzyl-2'-keto - imidazolido)-2-hydroxy-thiophane,
13. 3,4-(N-monoacetyl-2'-keto-imidazolido)-2-keto-thiophane,
14. 3,4-(N-monoacetyl-2'-keto - imidazolido)-thiophane,
15. 3,4-(N-monoacetyl-2'-keto-imidazolido) - 2-hydroxy-thiophane,
16. 3,4-(1',3'-di-acetyl - 2' - keto-imidazolido)-thiophane,
17. 3,4-(1',3'-di-acetyl - 2' - keto-imidazolido)-2-keto-thiophane,
18. 3,4-(1',3'-di-acetyl - 2' - keto-imidazolido)-2-hydroxy-thiophane.

It is to be understood that the specification and claims embrace all tautomeric forms of our compounds. Moreover, it will be understood that the monoaralkyl compounds described herein may contain the monoaralkyl group in the 1' or 3' position and that the monoacylated compounds may be N-acyl or 2'-O-acyl derivatives, the latter being derivatives of a tautomeric form, while the diacylated compounds can contain the acyl groups attached to both nitrogen atoms or to one of the nitrogen atoms and the oxygen atom in 2'-position, in the latter case being derived from a tautomeric form. For convenience, the acylated compounds are named herein with the acyl groups attached to the nitrogen atom.

The new thiophanes can be produced from 3,4 - (2' - keto - imidazolido) - 2 - keto - 5-acyloxy-tetrahydrofurans of the general formula (B), or the corresponding free aldehydo-acids in their open (C) or cyclic (D) forms, in which R and R' stand for hydrogen, or a radical which can be replaced by hydrogen, at least one of R and R' being such a radical, and Ac stands for acyl. R and R' have the same significance as in general formula (A).

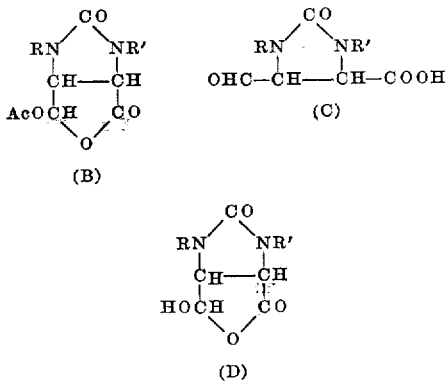

(B)

(C)

(D)

For this purpose compounds of the formulae (B), (C) and (D) are first treated with hydrogen sulfide in an acidified solution, as in an organic solvent acidified with hydrogen chloride, and the product obtained subsequently reacted with a salt of hydrogen sulfide, such as potassium or sodium hydrosulfide, in an organic solvent, for example, ethyl alcohol. The reaction mixture is then acidified, extracted with an organic solvent, the organic extract concentrated in vacuo, and the residue reduced, for example, with zinc and acetic acid. The reduced reaction mixture is filtered, the filtrate concentrated in vacuo, the residue treated with mineral acid, and the mixture extracted with an organic solvent. The organic solution is then concentrated, and the 2-keto-thiophane, corresponding to the above formula (A) where X stands for C=O, is obtained. By reducing this compound partially, the corresponding compound where X is CH(OH) is obtained. By total reduction, the compound where X is CH₂ results. N,N'-di-aralkyl-substituted thiophanes of the general formula (A), obtained by the methods described above, can be converted into the corresponding N-mono-substituted compounds by treatment with an alkali metal such as sodium, for instance, in liquid ammonia.

The following example will illustrate the preparation of a 2-keto-thiophane:

EXAMPLE I

*Thiolactone of 1,3-dibenzyl-cis-4-carboxy-5-mercaptomethyl-imidazolidone-2 or 3,4-(1',3'-dibenzyl-2'-keto-imidazolido)-2-keto-thiophane*

A. A vigorous stream of hydrogen chloride and hydrogen sulfide is passed through a suspension of 150 grams of the acetate of the cyclic form of 1,3 - dibenzyl - cis - 4 - carboxy - 5 - formyl-imidazolidone-2 in 850 cc. of absolute alcohol cooled to —10 to —20° C. After about 1½ hours, most of the starting material is dissolved. To complete the reaction, hydrogen chloride and hydrogen sulfide are passed through the solution for another hour. The solution is then concentrated in vacuo, at the lowest possible temperature and with exclusion of moisture. Some toluene is added to the residue and distilled off in vacuo, thus removing most of the hydrogen chloride still present.

B. A vigorous stream of hydrogen chloride and hydrogen sulfide is passed through a solution of 150 grams 1,3-dibenzyl-cis-4-carboxy-5-formyl-imidazolidone-2 in 850 cc. absolute alcohol cooled to —10 to —20°. After 2½ hours the solution is concentrated in vacuo at the lowest possible temperature and with exclusion of moisture. Some toluene is added to the residue and distilled off in vacuo, thus removing most of the hydrogen chloride still present.

C. The residual oil from reaction A or reaction B is dissolved in 1200 cc. of a suspension of potassium hydrosulfide in alcohol. (This suspension is prepared by saturating a mixture of 672 grams of potassium hydroxide and 4 liters of alcohol with hydrogen sulfide.) The mixture is left at room temperature for 15 hours, then refluxed for 1 hour, poured on ice and acidified with dilute sulfuric acid. The organic part is extracted with ether, the solution is dried with sodium sulfate and concentrated in vacuo. The residue is reduced in a stirred refluxing mixture of 900 grams of zinc dust, 150 grams of granulated zinc (20 mesh) and 2.3 liters acetic acid. After 4 hours, the solution is filtered, and the mixture of zinc and zinc acetate remaining on the funnel is washed with ether and water. The filtrate is concentrated in vacuo and diluted with ether and 40% sulfuric acid until clear separation takes place. The ether layer is separated, washed with water and concentrated in vacuo to a small volume. After 24-48 hours the mixture becomes crystalline. It is then diluted with some ether and filtered. Melting point 123-124° C.

The thiolactone can be recrystallized from a mixture of acetone, ether and petrol-ether. The pure compound forms colorless plates melting at 126-127° C. It is soluble in strong alkali, and gives a positive mercaptan test with sodium nitroprusside.

The above procedure can be modified, for instance, by using in reaction A (and/or B) 99% isopropanol as solvent, and by working at temperatures up to +30° C.

In step C the equivalent amount of sodium hydrosulfide can be used instead of the potassium salt, and the extractions can be carried out, for instance, with benzene, instead of with ether.

The pure 3,4-(1',3'-dibenzyl-2'-keto-imidazolido)-2-keto-thiophane reacts in a very interesting manner on treatment with zinc and acetic acid. If zinc amalgamated with mercury is employed, 3,4-(1',3'-dibenzyl-2'-keto-imidazolido)-thiophane (I) is almost exclusively obtained. If, on the other hand, finely divided zinc alone is employed, 3,4 - (1',3'-dibenzyl-2'-keto-imidazolido) - 2 - hydroxy-thiophane (II) is obtained mixed with varying amounts of compound (I). Henceforth, compound (I) will be referred to as "thiophane," whereas compound (II) will be referred to as "thiophanol."

The following example will illustrate the preparation of these compounds:

EXAMPLE II

*3,4 - (1',3' - dibenzyl-2'-keto-imidazolido)-thiophane and 3,4-(1',3'-dibenzyl-2'-keto-imidazolido)-2-hydroxy-thiophane*

A stirred solution of 10 grams 3,4-(1',3'-dibenzyl - 2' - keto-imidazolido)-2-keto-thiophane in 400 cc. of acetic acid is refluxed for 4 hours with 150 grams of zinc powder and 50 grams of granulated zinc (40 mesh). The solution is filtered, the zinc is washed with alcohol and the combined solutions are concentrated in vacuo. Water and ether are added, the organic layer is separated, washed first with water and then with alkali, to extract all the unreacted "thiolactone," dried and concentrated in vacuo. The neutral product is recrystallized from a mixture of ethyl acetate, ether and petrol-ether. It crystallizes first in needles or prisms melting around 120–125° C., and constitutes a mixture of 3,4-(1',3'-dibenzyl-2' - keto - imidazolido) - thiophane (I) and 3,4-(1',3' - dibenzyl-2'-keto-imidazolido)-2-hydroxy-thiophane (II). The two components can be separated by repeated crystallization from acetone-ether, or preferably by chromatographic purification. In the latter case, the mixture is dissolved in benzene, and the solution is passed through a column of 60 grams of chromatographic grade aluminum-oxide. The column is washed with benzene until the amounts extracted become negligible. The solutions are concentrated and the residue is recrystallized from acetone-ether. Pure compound (I) thus obtained forms prisms or needles melting at 113–114° C. If the granulated zinc employed in the reaction is amalgamated with mercuric chloride, compound I is obtained almost exclusively.

Compound II which is adsorbed on the column, is eluted with ethyl acetate. The percolates are concentrated in vacuo and the residue is recrystallized from acetone-ether, forming fine needles melting at 144–145° C.

Compound II gives no mercaptan test with sodium nitroprusside. No aldehydo derivatives could be prepared and the compound does not react like an aldehyde with alkyl-magnesium compounds. (Only unchanged starting material is recovered.) The substance gives, however, a silver mirror with ammoniacal silver-oxide solution. This reaction can be used as test for the purity of compound I. Pure compound I does not reduce. Although it is almost impossible to prepare pure compound I by fractional crystallization, the chromatographed product is completely free of compound II.

Compound II can also be formed by reduction of 3,4-(1',3' - dibenzyl - 2'-keto-imidazolido)-2-keto-thiophane with Raney nickel in methanol at atmospheric pressure and room temperature.

Compounds wherein only one of the nitrogen atoms in the imidazolidone nucleus is substituted are illustrated by the following examples:

EXAMPLE III

*3,4-(1'-benzyl-2'-keto-imidazolido)-thiophane*

Sodium is added in small portions to a solution of 4 m. moles of 3,4-(1',3'-dibenzyl-2'-keto-imidazolido)-thiophane in about 50 cc. of liquid ammonia. The deep blue color, appearing when the sodium is added, vanishes almost instantaneously. After about 8 m. moles of sodium are added, the blue color starts to disappear at a much slower rate. The addition of sodium is then stopped, and the excess present in solution is destroyed with ammonium chloride. The ammonia is evaporated, the residue is acidified with dilute sulfuric acid, and the reaction product is extracted with ethyl acetate. The organic solution is dried, concentrated in vacuo and the residue is recrystallized from a mixture of acetone, ether and petrol-ether, or benzene-ether. Needles melting at 131–132° C.

EXAMPLE IV

*3,4-(N-monobenzyl-2'-keto-imidazolido)-2-keto-thiophane*

To a cooled (Dry Ice bath), stirred solution of 17 g. of 3,4-(1'3'-dibenzyl-2'-keto-imidazolido)-2-keto-thiophane in 200 cc. of liquid ammonia, sodium is added in small portions until a persisting blue color develops (about 4.3 grams sodium are used). The last excess of sodium is destroyed with ammonium chloride, the ammonia is evaporated, and dilute hydrochloric acid and ether are added. The mixture is stirred for a while and then filtered. The bulk of the reaction product remains on the funnel; a smaller part is dissolved in the ether layer of the filtrate. The latter is separated (if some product precipitates, ethylacetate is added), dried and concentrated in vacuo. The residue is recrystallized from acetone-ether, together with the product obtained by filtration.

The product can be recrystallized from acetone. Fine needles melting at 217–218.5° C. are obtained.

By proceeding in the same manner as described in the previous examples, but employing as starting materials 3,4-(1,3-di-p-methoxybenzyl-2'-keto - imidazolido) - 2 - keto-5-acetoxy-tetrahydrofuran, there can be obtained the corresponding 3,4-(1',3'-di-p-methoxybenzyl-2'-keto-imidazolido) - 2 - keto - thiophane, 3,4 - (1',3' - di-p-methoxybenzyl - 2' - keto - imidazolido) - thiophane, and 3,4-(1',3' - di - p-methoxybenzyl-2'-keto-imidazolido)-2-hydroxy-thiophane.

3,4-(monoacyl- or diacyl-2'-keto-imidazolido)-2-keto-5-acyloxy-tetrahydrofurans can be converted in a similar way into 3,4-(2'-keto-imidazolido)-thiophanes of the general formula A.

The following examples will illustrate the method of preparing the intermediates employed to produce the new thiophane compounds.

EXAMPLE V

*1,3-dibenzyl-imidazolidone-(2)-cis-4,5-dicarboxylic acid and its anhydride*

To a stirred, ice-cooled solution of 648 grams (1.98 moles) of bis-benzyl-aminosuccinic acid in 2 liters of 3 N potassium hydroxide, are added in small portions (within 1½ hours) 1.6 liters of a 3.75 molar solution of phosgene in xylene (=6 moles COCl₂) and 2.7 liters 6 N potassium hydroxide (=14 moles). The mixture is then acidified with concentrated hydrochloric acid, and the precipitate formed is filtered off and washed with water. The precipitate is then washed thoroughly with hot alcohol, and the aqueous filtrate is extracted several times with ethyl acetate. The alcoholic solution and the ethyl acetate extract contain all the imidazolidone-dicarboxylic acid formed. The alcohol insoluble part of the precipitate is pure starting material. The alcoholic and ethyl acetate solutions are taken to dryness, and the residue is refluxed with benzene until it becomes completely crystalline. The cooled mixture is filtered; the main part of the dibenzyl-imidazolidone-dicarboxylic acid remains on the funnel. It can be recrystallized from ethyl acetate forming prisms, melting first at 167° C., then resolidifying again and melting at 236° C.

The benzene mother liquor is concentrated in vacuo, and the rest of the reaction product is isolated in the form of its anhydride in the following way: The oily residue is refluxed with acetic anhydride, then the mixture is concentrated and benzene is added. The anhydride formed crystallizes in nice needles melting at 236–237° C.

EXAMPLE VI

*Acetate of the cyclic form of 1,3-dibenzyl-cis-4-carboxy-5-formyl-imidazolidone-2 or 3,4-(1',3'-dibenzyl-2' - keto-imidazolido)-2-keto-5-acetoxy-tetrahydrofuran*

A mixture of 100 grams of the anhydride of 1,3-dibenzyl - imidazolidone-(2)-cis-4,5-dicarboxylic acid, 150 grams of zinc dust, 100 grams zinc powder (40 mesh), 1500 cc. acetic anhydride and 500 cc. acetic acid is stirred and refluxed for 10–15 hours. The dicarboxylic acid can be used instead of the anhydride. In that case, the acid is first mixed with the acetic anhydride, refluxed for 10 minutes and then the other constitutents are added. The amounts of acetic acid and anhydride can be reduced to about ½ without affecting the yield. If too little is used, the yield is reduced. After that time, the mixture is cooled, filtered and the precipitate on the funnel washed with ethyl acetate. The filtrate is concentrated in vacuo, and the oily or partly crystalline residue is treated with ice water and ethyl acetate, until all the organic substance is dissolved. The ethyl acetate layer is washed with water, dried with sodium sulfate and concentrated in vacuo. The oily or partly crystalline residue is boiled up with acetic anhydride, in order to reconvert any of the compound decomposed during the treatment with water into the cyclic acetate. The mixture is again concentrated in vacuo. Xylene is then added to the residue, and part of it is distilled off in vacuo, then ether and petrol-ether are added. The reaction product separates in fine needles or prisms, which melt at 103–104° C. After drying, the melting point is 124–125° C.

EXAMPLE VII

*Cyclic acetate of 1,3-di-p-methoxybenzyl-cis-4-carboxy-5-formyl-imidazolidone-2 or 3,4-(1,3-di-p - methoxybenzyl -2 '-keto-imidazolido) -2-keto-5-acetoxy-tetrahydrofuran*

112 grams of 1,3-di-p-methoxybenzyl-imidazolidone-(2)-cis-4,5-dicarboxylic acid are refluxed for 10 minutes with 840 cc. of acetic anhydride. The clear solution is cooled slightly; 325 grams of zinc dust and 330 cc. acetic acid are added, and the reaction mixture is stirred and refluxed for 16 hours. After cooling, ethyl acetate is added and the zinc and zinc acetate is extracted 3 times with boiling ethyl acetate. The combined ethyl acetate washings and filtrates are concentrated in vacuo, and the residual oil is treated with benzene. After allowing the solution to stand for a few hours at room temperature, zinc acetate and unchanged starting material are separated by decantation. After distilling off the benzene in vacuo, the residue crystallizes upon treatment with ether and petrol-ether. M. P. 80–93° C. After two recrystallizations from acetone-ether, the melting point is 110–111° C.

Alternatively, the anhydride of the dicarboxylic acid can be reduced with zinc in a mixture of acetic acid and acetic anhydride to form the cyclic acetate.

1,3-di-p- methoxybenzyl - imidazolidone-2-cis-4,5-dicarboxylic acid can be prepared by reacting meso-dibromo-succinic acid with p-methoxybenzyl-amine to form meso-bis-p-methoxybenzyl-amino-succinic acid, and condensing the latter with phosgene.

EXAMPLE VIII

*Diacetyl-imidazolidone-(2)-4,5-cis - dicarboxylic acid and acetate of the cyclic form of monoacetyl-cis-4-carboxy-5-formyl- imidazolidone-2 or 3,4-(monoacetyl-2'-keto-imidazolido) -2-keto-5-acetoxy-tetrahydrofuran*

A stirred suspension of 44 grams of the sodium salt (or the corresponding amount of barium salt) of imidazolidone-(2)-cis-4,5-dicarboxylic acid in a mixture of 60 cc. of acetic acid and 300 cc. of acetyl chloride is first refluxed for 4 hours then stirred at room temperature for 15 hours. The mixture is then heated up again, diluted with warm ethyl acetate and filtered. The filtrate containing the acetylated anhydride of imidazolidone-(2)-cis-4,5-dicarboxylic acid is concentrated in vacuo, and the residual mixture (oil and crystals) is dissolved in 350 cc. of acetic anhydride. 150 cc. of acetic acid and 175 grams of zinc powder are added, and the mixture is stirred and refluxed for 23 hours. Hot ethyl acetate is added, and the mixture is filtered and the zinc is washed several times with hot ethyl acetate. The solutions are combined and concentrated in vacuo. The residue is heated up with benzene and becomes partly crystalline. The benzene insoluble crystals are filtered off and are recrystallized from water. Needles melting at 207–211° C. are thus obtained. The analysis shows that this compound is a hydrate of the diacetyl-imidazolidone-(2)-cis-4,5-dicarboxylic acid.

The benzene solution containing the cyclic acetate of the diacetyl-cis-4-carboxy-5-formyl-imidazolidone-2 is concentrated in vacuo. A small amount of water is added to the residual oil to hydrolyze one of the acetyl groups. After several hours the product is converted into benzene insoluble prisms, which are recrystallized from water and melt then at 193–195° C. This product is the cyclic acetate of monoacetyl-cis-4-carboxy-5-formyl-imidazolidone-2.

Imidazolidone-(2) - cis - 4,5 - dicarboxylic acid can be obtained by reacting meso-diamino-succinic acid with phosgene.

It will be understood that instead of the acetate of the cyclic form of 1,3-disubstituted-cis-4-carboxy-5-formyl - imidazolidone-2, the corresponding homologous lower aliphatic acid-derivatives can also be employed, as, for example, the propionate or the butyrate. These acyl-derivatives can be prepared in the same way as the acetate; namely, by carrying out the reduction of the anhydride of the 1,3-disubstituted-imidazolidone-(2)-cis-4,5-dicarboxylic acid with zinc in the presence of the corresponding lower aliphatic acid and its anhydride.

We claim:

1. A 3,4-(2'-keto-imidazolido) - thiophane of the following formula:

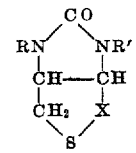

wherein X is a member from the group consisting of C=O, $CH_2$ and CH(OH), and R and R' are selected from the group consisting of hydrogen, an aralkyl radical and a lower acyl radical, at least one of R and R' being such a radical.

2. A 3,4-(1',3'-diaralkyl-2'-keto-imidazolido)-2-keto-thiophane.

3. 3,4-(1',3'-dibenzyl-2'-keto - imidazolido) - 2 - keto-thiophane.

4. 3,4-(1',3'-dibenzyl-2'-keto-imidazolido) - 2 - hydroxy thiophane.

5. 3,4-(N-monobenzyl-2'-keto-imidazolido)-2 - keto-thiophane.

6. A process which comprises converting a compound from the group consisting of 3,4-(1',3'-diaralkyl-2'-keto-imidazolido) -2- keto - 5 - lower acyloxy-tetrahydrofurans, 1,3-diaralkyl-cis-4-carboxy-5-formyl-imidazolidone-2 and its cyclic form, 3,4-(1',3'-diaralkyl-2'-keto-imidazolido) -2-keto-5-hydroxy-tetrahydrofuran, to 3,4-

(1',3'-diaralkyl-2'-keto - imidazolido) - 2 - keto-thiophane, by subjecting said compound to the action of hydrogen sulfide in acid solution, followed by treatment with a salt of hydrogen sulfide, and finally reducing the reaction product.

7. A process as in claim 6 wherein 1',3'-diaralkyl is 1',3'-dibenzyl.

8. A process as in claim 6 in which the salt of hydrogen sulfide is an alkali hydrosulfide and the reduction is carried out with acetic acid and zinc.

9. A process as in claim 6 in which the 3,4-(1',3'-diaralkyl-2'-keto - imidazolido) - 2 - keto - thiophane obtained in the process is treated with acetic acid and zinc to produce a mixture of 3,4-(1',3'-diaralkyl-2-keto - imidazolido) - thiophane and 3,4-(1',3'-diaralkyl-2-keto-imidazolido) - 2 - hydroxy-thiophane, and separating the compounds from the mixture.

10. A process as in claim 7 wherein the 3,4-(1',3'-dibenzyl- 2' - keto - imidazolido) - 2 - keto - thiophane is debenzylated to form 3,4-(N-monobenzyl-2'-keto-imidazolido)-2-keto-thiophane.

11. A process as in claim 9 wherein 1',3'-diaralkyl is 1',3'-dibenzyl.

MOSES WOLF GOLDBERG.
LEO H. STERNBACH.

No references cited.